2,840,472
LIGHT SENSITIVE MATERIAL TO BE USED IN DIAZO PRINTING

Oskar Süs and Georg Werner, Wiesbaden-Biebrich, and Willy Wettlauffer, Wiesbaden, Germany, assignors, by mesne assignments, to Keuffel & Esser Co., Hoboken, N. J., a corporation of New Jersey No Drawing. Application March 13, 1956
Serial No. 571,148

Claims priority, application Germany March 17, 1955

14 Claims. (Cl. 96—75)

The present invention relates to the field of diazotype printing. More particularly, it relates to a new type of diazo compounds to be used in coating diazotype materials.

Diazo compounds with a tertiary nitrogen atom in paraposition, which may be considered derivatives of p-phenylene diamine diazotized on one side and in which the amino-group on the other side is disubstituted, have gained considerable practical interest as light sensitive components for the diazotype process. Such diazo compounds of p-phenylene diamine with a tertiary nitrogen atom in which this tertiary nitrogen atom of the p-phenylene diamine is at the same time a member of a heterocyclic ring system, have also been proposed for reproduction purposes. For example, the diazo compounds obtained from N-amino phenyl piperazines or N-amino phenyl morpholines fall in this latter group.

Now the object of the present invention is a new light sensitive diazotype material in which the light sensitive component is a diazo compound prepared from a p-phenylene diamine with a tertiary amino group. It has been found that diazotype material with excellent qualities is obtained when the light sensitive layer is prepared by means of diazo compounds corresponding to the general formula:

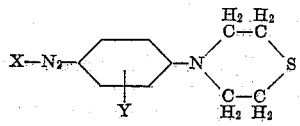

in which

X is an acid radical, and
Y is a member selected from the group consisting of hydrogen, alkyl, alkoxy and halogen.

These diazo compounds may be used in two component diazotype materials (materials in which the azo component is added to the solution of the diazo compound prepared from an N-p-amino-phenyl thiomorpholine body and used for sensitizing the layer according to the present invention) or the diazo compound may be used in one component diazotype materials, materials in which the azo component is applied to the exposed material together with the alkaline developer. Depending on the azo component used, prints are obtained which show very heavy shades of blue, brown or yellow.

The yellow and brownish-yellow dyes obtained by means of the light sensitive material according to the present invention have excellent opacity towards light rays in the far ultra violet range. This is of special technical importance because diazo prints obtained in accordance with the present invention on transparent papers by means of azo components yielding yellow colors form excellent intermediate prints which may be used for making further copies on diazotype paper. When dissolved in organic solvents, the diazo compounds to be used as light sensitive substances according to the present invention are absorbed by hydrophobic supports e. g. cellulose acetate, much more readily than the diazo compounds of N-amino phenyl-morpholines. Because of this better absorption, a steeper gradation is obtained. When transparent base materials are used, light sensitive material is obtained which yields dimensionally stable intermediate prints of excellent opacity and with considerably better contrast than intermediate prints manufactured from diazotype material of the customary type.

The diazo compounds corresponding to the above formula are the diazonium salts and double salts of the N-p-diazo-phenyl-thiomorpholine itself. Equally suitable, are diazo compounds corresponding to this general formula in which the benzene ring is substituted by alkyl groups, alkoxy groups or halogen atoms.

The diazo compounds of the present invention have not been described before in the literature. They are prepared by known methods, starting from unsubstituted N-phenyl-thiomorpholine or an N-phenyl-thiomorpholine which is substituted in the phenyl radical by halogen, alkyl or alkoxy, i. e. either via the nitroso compound which is subsequently reduced to the corresponding amino compound, or by first converting the respective starting material into an azo dye-stuff by coupling with diazo compounds and then transforming the azo dye-stuff into the amino-phenyl-thiomorpholine. From these amino phenyl-thiomorpholines the diazo compounds or their salts and double salts, respectively, are obtained in known manner. The salts and double salts are readily crystallizable yellow colored bodies.

The following examples are inserted in order to illustrate the present invention, the parts being by weight if not otherwise stated. No restriction of the invention to the subject matter disclosed in the examples is intended.

Example 1

1.0 g. of the hydrofluoboric acid salt of the diazo compound of N-4'-amino-phenyl-(1')-thiomorpholine,
2.0 g. of citric acid,
1.0 g. of aluminum sulfate,
2.5 g. of thiourea,
1.5 g. of boric acid, and
0.5 g. of pyrocatechin-mono-β-hydroxyethyl ether are dissolved in 50 cc. of water, and the solution is coated onto one side of a transparent paper. The light sensitized paper thus obtained is exposed under a transparent original and developed with gaseous ammonia. Prints with strong brownish-yellow shades are obtained which owing to the excellent printing density of the image may be advantageously used as intermediate prints.

N-4'-diazo-phenyl-(1')-thiomorpholine is obtained by converting the N-phenyl-thiomorpholine known in the literature (in the form of its hydrochloride dissolved in dimethyl formamide) at a temperature of 0–5° C. into the nitroso compound by means of a sodium nitrite solution, and then reducing the nitroso compound by cautiously adding zinc dust while cooling. After filtering off the reaction mixture, the hydrochloride of N-4'-amino-phenyl-(1')-thiomorpholine contained in the colorless solution is diazotized by adding concentrated hydrochloric acid and sodium nitrite at a temperature of 0–5° C. The diazo compound crystallizes in the form of its zinc chloride double salt. Thus 300 g. of the crude zinc chloride double salt of N-4'-diazophenyl-(1')-thiomorpholine are obtained from 270 g. of N-phenyl thiomorpholine. The zinc chloride double salt is purified by filtering its aqueous solution with animal charcoal and salting out the purified zinc chloride double salt by adding sodium chloride to the filtrate. Yellow crystals are formed which melt at 165–167° C. with decomposition. If hydrofluoboric acid (50%) is added to the filtered solution of the zinc chloride double salt, the light-yellow hydrofluoboric acid salt of N-4'-diazophenyl-(1')-thiomorpholine is obtained which melts at 160–163° C. with decomposition.

Example 2

1.8 g. of citric acid,
1.2 g. of thiourea,
1.8 g. of aluminum sulfate,
1.6 g. of boric acid, and
3.8 g. of the hydrofluoboric acid salt of the diazo compound of N-4'-amino-phenyl-(1')-thiomorpholine are added to a solution containing 1.6 g. of resorcinol in 50 cc. of isopropyl alcohol, and the solution is diluted with water to 100 cc. This solution is coated onto paper which previously had been coated with cellulose acetate. After drying the sensitized paper thus obtained produces prints with strong yellow colored shades by the so-called "dry process." These prints are excellently suited for use as intermediate prints.

Example 3

2.0 g. of 3-hydroxy-2-naphthoic acid ethylene-diamide-chlorohydrate,
4.0 g. of citric acid,
3.0 g. of boric acid,
5.0 g. of thiourea, and
4.0 g. of the sodium salt of 1,3,6-naphthalene-trisulfonic acid are dissolved in 75 cc. of water. This solution is mixed with a solution of 2.8 g. of the zinc chloride double salt of the diazo compound of the N-4'-amino-phenyl-(1')-thiomorpholine in 25 cc. of water, and the mixture is used for the manufacture of a light sensitive paper for diazotype purposes. By means of this paper prints are obtained with dark blue color shades.

Instead of 2.8 g. of the zinc chloride double salt of the diazo compound of N-4'-amino-phenyl-(1')-thiomorpholine 3.0 g. of the cadmium chloride double salt or 3.4 g. of the tin tetrachloride double salt of this diazo compound may be used with equally good results.

The cadmium chloride double salt is obtained by mixing a solution of about 5% zinc chloride double salt with a 17.5% solution of cadmium chloride. The cadmium chloride double salt is obtained in the form of beautiful yellow crystals and melts at 157° C. with decomposition.

The tin tetrachloride double salt is obtained by mixing a 5% solution of the zinc chloride double salt with an aqueous solution of about 50% of tin tetrachloride. The double salt forms yellow needles which melt at 168° C. with decomposition.

Example 4

1.2 g. of the zinc chloride double salt of the diazo compound of N-4'-amino-3'-ethoxy-phenyl-(1')-thiomorpholine,
2.0 g. of citric acid,
1.0 g. of aluminum sulfate,
2.5 g. of thiourea, and
1.5 g. of boric acid are dissolved in 50 cc. of water, and 1 g. of the hydrochloride of 1-(7'-hydroxy-naphthyl)-2,4-diimino-tetrahydro-1,3,5-triazine is added to this solution. The light sensitive paper prepared with the solution is exposed and developed as usual and yields prints having an image of heavy blue lines.

Instead of the diazo compound mentioned above the zinc chloride double salt of the diazo compound of N-4'-amino-3'-methyl-phenyl-(1')-thiomorpholine may be used with equally good results for the manufacture of the light sensitive paper.

N-4'-diazo-3'-ethoxy-phenyl-(1')-thiomorpholine is prepared by boiling m-ethoxy-N,N-di-β-chloroethyl-aniline with crystalline sodium sulfide and sodium iodide in aqueous acetone with a reflux condenser, freeing the reaction product from acetone and removing the N-3'-ethoxy-phenyl-(1')-thiomorpholine by treatment with ether. The fluid thus obtained boils at 181–185° C. under 12 mm. of pressure.

In analogy to the method described in Example 1, N-3'-ethoxy-phenyl-(1')thiomorpholine is first converted into the 4'-nitroso compound, which is then suspended in dimethyl formamide and reduced to the 4'-amino compound by means of zinc dust. The 4'-amino compound, without previous isolation, is finally diazotized in known manner with sodium nitrite in a hydrochloric solution. The zinc chloride double salt of the diazo compound precipitates and may be subsequently purified by filtering the aqueous solution with animal charcoal and adding sodium chloride to the filtrate. The yellow crystals of the zinc chloride double salt of N-4'-diazo-3'-ethoxy-phenyl-(1')-thiomorpholine melt at 165–167° C. with decomposition.

Analogously the 3-methyl-N,N-di-β-chloro-ethyl-aniline is first converted into N-3'-methyl-phenyl-(1')-thiomorpholine, which is obtained as a colorless oil with a boiling point of 156° C., under 12 mm. of pressure. In analogy to the method stated above in connection with the N-4'-diazo-3'-ethoxy-phenyl-(1')-thiomorpholine, N-3'-methyl-phenyl-(1')-thiomorpholine is then transformed into the corresponding nitroso compound, which is subsequently reduced with zinc dust. The amino compound thus obtained is diazotized and the diazo compound, i. e. its zinc chloride double salt, separates in the form of crystals. As described above, this compound is purified by filtering the aqueous solution of the crude zinc chloride double salt with animal charcoal and adding sodium chloride to the filtrate. After purification, the yellow crystals of the zinc chloride double salt of N-4'-diazo-3'-methyl-phenyl-(1')-thiomorpholine melt at 150–153° C. with decomposition.

Example 5

A base paper material is coated with an aqueous solution containing

2% of the zinc chloride double salt of N-4'-diazo-3'-chloro-phenyl-(1')-thiomorpholine
2% of the sodium salt of 1,3,6-naphthalene-trisulfonic acid, and
0.5% of citric acid.

After drying the light sensitized paper, it is exposed under an original and developed with an aqueous solution containing 0.5% of phloroglucinol and 0.4% of resorcinol and rendered alkaline by addition of borax and sodium carbonate. The prints thus obtained have an image with strong brown shades.

The N-4'-diazo-3'-chlorophenyl-(1')-thiomorpholine is prepared analogously to the method stated for the N-4'-diazo-3'-ethoxy - phenyl - (1') - thiomorpholine. Starting material is the m-chloro-N,N-di-β-chloro-ethyl-aniline which is converted first, by boiling in a reflux condenser as described above, into the N-3'-chloro-phenyl-(1')-thiomorpholine, a light-yellow oil with the boiling point 175–178° C. This compound is then transformed into the nitroso compound which is subsequently reduced with zinc dust. The amino compound thus formed without previous isolation is finally transformed into the N-4'-diazo-3'-chloro-phenyl-(1')-thiomorpholine by diazotization with sodium nitrite. Following the above stated method the N-4'-diazo-3'-chloro-phenyl-(1')-thiomorpholine is obtained in the form of its zinc chloride double salt, which forms yellow crystals and melts at 169–171° C. with decomposition.

Example 6

2.0 g. of the tin tetrachloride double salt of the diazo compound of N - 4' - amino - 2' - methoxy-phenyl-(1')-thiomorpholine,
1.5 g. of 2,3-dihydroxy-naphthalene-6-sulfonic acid (sodium salt),
2.0 g. of citric acid, and
2.5 g. of thiourea are dissolved in 75 cc. of water. This solution is used for making light sensitive diazotype paper. After exposure under an original and subsequent development with gaseous ammonia this paper yields blue prints with a slight violet tint.

N-4'-diazo-2'-methoxy-phenyl-(1')-thiomorpholine is prepared as follows:

By boiling with sodium sulfide in aqueous acetone, o-methoxy-N,N-di-β-chloroethyl-aniline is converted into n-2'-methoxy-phenyl-(1')-thiomorpholine. The reaction product is a light yellow oil which boils at 159–160° C., under a pressure of 12 mm.

8 g. of this product are dissolved in 230 cc. of glacial acetic acid and then mixed with 2 cc. of concentrated hydrochloric acid. While cooling to 0–5° C., 8 cc. of a 40% sodium nitrite solution are added dropwise to the solution, and the reaction mixture is stirred for two hours without further cooling. The yellow nitroso compound crystallizes out. It is filtered off, recrystallized from benzene and dried. The dried nitroso compound is then dissolved in some alcohol and catalytically reduced using Raney-nickel as a catalyst. The alcoholic solution of the amine thus formed is strongly concentrated and the amine which crystallizes upon cooling is diazotized. The diazo compound formed is contained in a dissolved state in the reaction mixture and is precipitated therefrom in the form of the tin tetrachloride double salt by adding a solution of tin tetrachloride to the diazotization mixture. The tin tetrachloride double salt of N-4'-diazo-2'-methoxy-phenyl-(1')-thiomorpholine forms yellow crystals which melt at 176–178° C. with decomposition.

Example 7

A 10% solution in acetone of a polyacryl resin obtained by inter-polymerization of acrylic acid ethyl ester and acrylonitrile is coated as a thin layer onto a stretched and fixed foil of high molecular weight polyethylene terephthalate (well-known highly polymeric linear esters of terephthalic acid and ethylene glycol). After thoroughly drying this coated resin solution, there is applied on top of the polyacryl resin layer a sensitizing solution which has been obtained by dissolving 1.1 g. of the hydrofluoboric acid salt of the diazo compound of N-4'-amino-phenyl-(1')-thiomorpholine,
0.7 g. of 2-hydroxy-diphenyl,
7.0 g. of a highly ethylated ethyl cellulose of medium viscosity, and
1.0 g. of citric acid in 150 cc. of alcohol and adding 0.2 g. of boric acid,
0.5 g. of phthalic acid dibutyl ester,
5.0 cc. of butanol, and
5.0 cc. of toluene to the solution before coating it onto the pre-coated foil. The sensitizing solution thus coated onto the foil is dried at a temperature of 90–100° C. and then exposed under an original in known manner. After developing the exposed foil with gaseous ammonia a print is obtained which shows the image of the original in yellow shades. The print is well suited to be used as an intermediate print of good opacity for the production of further copies.

Having thus described the invention what is claimed is:

1. Photoprinting material comprising a light sensitive diazo compound according to the following general formula

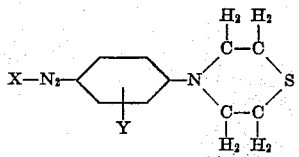

in which X is an acid radical, Y is selected from the group consisting of hydrogen, alkyl, alkoxy and halogen coated on a base sheet material.

2. Photoprinting material comprising an azo dye coupling component and a light sensitive diazo compound according to the following general formula

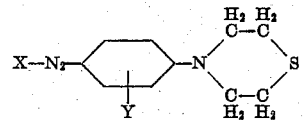

in which X is an acid radical, Y is selected from the group consisting of hydrogen, alkyl, alkoxy and halogen coated on a base sheet material.

3. Photoprinting material comprising a light sensitive diazo compound according to the following general formula

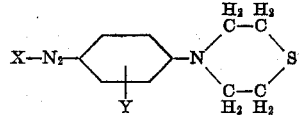

in which X is an acid radical, Y is selected from the group consisting of hydrogen, alkyl, alkoxy and halogen coated on a base sheet of hydrophobic material.

4. Photoprinting material comprising a light sensitive diazo compound according to the following general formula

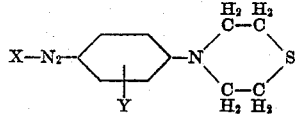

in which X is an acid radical, Y is selected from the group consisting of hydrogen, alkyl, alkoxy and halogen coated on a base sheet of cellulose acetate.

5. Photoprinting material comprising the hydrofluoboric acid salt of the diazo compound of N-4'-amino-phenyl-(1')-thiomorpholine coated on a base sheet material.

6. Photoprinting material comprising the zinc chloride double salt of the diazo compound of N-4'-amino-3'-ethoxy-phenyl-(1')-thiomorpholine coated on a base sheet material.

7. Photoprinting material comprising the zinc chloride double salt of the diazo compound of N-4'-amino-3'-methyl-phenyl-(1')-thiomorpholine coated on a base sheet material.

8. Photoprinting material comprising the zinc chloride double salt of N-4'-diazo-3'-chloro-phenyl-(1')-thiomorpholine coated on a base sheet material.

9. Photoprinting material comprising the tin tetrachloride double salt of the diazo compound of N-4'-amino-2'-methoxy-phenyl-(1')-thiomorpholine coated on a base sheet material.

10. Photoprinting material comprising a foil of oriented high molecular weight polyethylene terephthalate coated with a polyacryl resin and a light sensitive diazo compound according to the following general formula

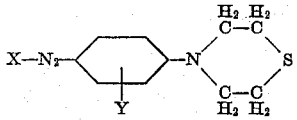

in which X is an acid radical, Y is selected from the group consisting of hydrogen, alkyl, alkoxy and halogen coated on said polyacryl resin.

11. Photoprinting material comprising the hydrofluoboric acid salt of the diazo compound of N-4'-amino-phenyl-(1')-thiomorpholine coated on a base sheet of cellulose acetate.

12. Photoprinting material comprising a foil of oriented high molecular weight polyethylene terephthalate coated with a subbing layer and a light sensitive diazo compound according to the following general formula:

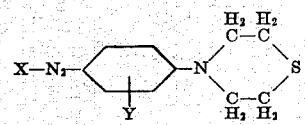

in which X is an acid radical, Y is selected from the group consisting of hydrogen, alkyl, alkoxy and halogen coated on said subbing layer.

13. Photoprinting material comprising a foil of oriented high molecular weight polyethylene terephthalate coated with a subbing layer and the diazo compound of N-4'-amino-phenyl-(1')-thiomorpholine coated on said subbing layer.

14. Photoprinting material comprising a foil of oriented high molecular weight polyethylene terephthalate coated with a polyacryl resin and the diazo compound of N-4'-amino-phenyl-(1')-thiomorpholine coated on said polyacryl resin.

References Cited in the file of this patent

UNITED STATES PATENTS 2,298,444  Weissberger et al. _____ Oct. 13, 1942